A. E. CHERNACK.
LATHE CHUCK.
APPLICATION FILED JAN. 15, 1916.
1,188,369.
Patented June 20, 1916.
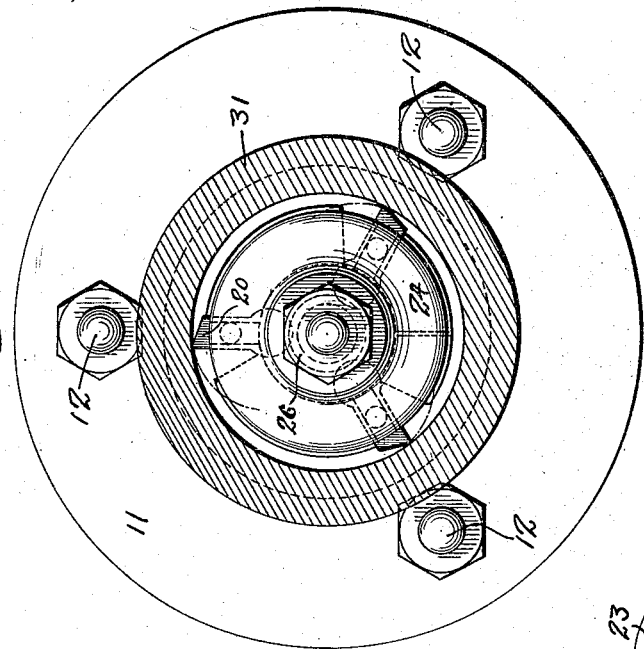
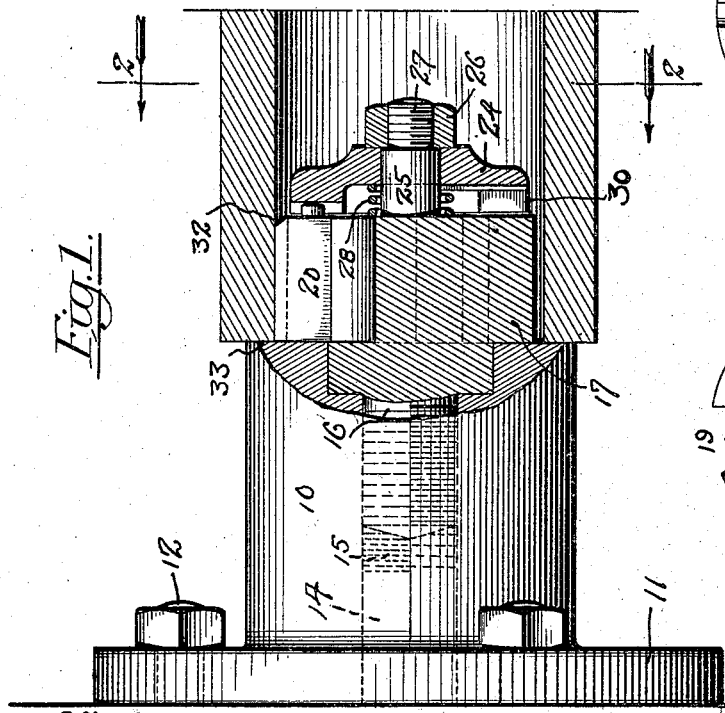
Witness
Titus H. Ume.
Inventor.
ABEL E. CHERNACK
By his Attorneys

UNITED STATES PATENT OFFICE.

ABEL E. CHERNACK, OF PROVIDENCE, RHODE ISLAND.

LATHE-CHUCK.

1,188,369.  Specification of Letters Patent.  Patented June 20, 1916.

Application filed January 15, 1916. Serial No. 72,314.

*To all whom it may concern:*

Be it known that I, ABEL E. CHERNACK, a subject of the Emperor of Russia, and a resident of the city of Providence, county of Providence, and State of Rhode Island, have invented a certain new and Improved Lathe-Chuck, of which the following is a specification.

My invention relates to lathe chucks and particularly to chucks for supporting hollow blanks, the object of my invention being to provide an improved chuck especially adapted for use with the lathe shown in my Patent No. 1,168,162.

In the accompanying drawings, Figure 1 is a broken side elevation of a chuck in which my invention is embodied in one form; Fig. 2 is a vertical section on the line 2—2, Fig. 1; Fig. 3 is an end elevation of the chuck head; Fig. 4 is an elevation of the chuck cap; and Fig. 5 is a perspective of one of the gripping dogs.

Referring to the drawings, the chuck here shown comprises a body 10 provided with a base flange 11 through which pass the securing bolts 12 by which it may be secured to the face plate 13 of a lathe of any suitable construction. As a matter of economy and convenience I prefer to make this body portion of the chuck of cast iron and it is centrally bored at 14 and tapped at 15 to receive the screw pin 16 which extends from the rear face of the chuck head 17. The latter is preferably of steel and it may be made of any suitable size to engage blanks of different internal diameters. The chuck head 17 is longitudinally bored at a plurality of points 18 on a common annulus and segmentally slotted at 19 in communication therewith to receive the gripping dogs 20. The inner ends of the latter are cylindrical and fit within the bores 18 in the chuck head, while the webs of the dogs extend through the slots 19. At their outer ends the dogs are beveled to provide engaging edges 21. Each dog is provided with a stud 22 which projects beyond the end of the chuck head and engages in radial slots 23 in a cap 24. The latter is freely mounted upon the cylindrical boss 25 on the chuck head and is retained in position by a nut 26, threaded on a tapped extension 27 of the boss 25. The cap 24 is constantly thrust in a direction to throw the dogs 20 into their "out" position by a spring 28, one end of which enters a socket 29 in the chuck head, while its other end engages a radial slot 30 in the cap. It is thus seen that the construction described provides a chuck having eccentrically pivoted dogs 20 which are normally spring-pressed outward to engage the inner face of blank 31 but are capable of swinging in the segmental slots 19 in a direction to draw inward the engaging edges 21 thereof. By reason of the engagement of the dogs with the cap 24 their expansion and contraction is rendered simultaneous and there is no danger that one dog will project beyond the chuck head farther than another. The blank 31 is thus always held concentric with the chuck.

To position the blank or the chuck it is merely necessary to press its end against the beveled ends 32 of the dogs and give the blank a slight twist in the direction of its rotation on the drive of the lathe. The frictional engagement of the blank with the dogs swings the latter inward on their respective axes of oscillation and consequently withdraws the dogs from their outermost position so that the blank may be slipped over the head of the chuck against the shoulder 33 formed by the body 10. Upon the rotation of the lathe and the application of a tool to the blank, the drag upon the blank causes the latter to lag behind the chuck. Inasmuch as the dogs are already in frictional engagement with the inner surface of the blank through the action of the spring 28, the dogs are now forced outward and dig into the inner surface of the blank thus gripping the latter firmly. If during the operation of the lathe there should be any shearing action between the dogs and the blank, resulting from excessive drag of the tool, the dogs automatically take care of this tendency by swinging farther out and digging farther into the blank until they are halted by their impingement against the side of the slots 19 in the chuck head.

As previously pointed out, the expansion of the dogs is rendered simultaneous through their common engagement with the cap 24 and one cannot expand without causing a simultaneous expansion of the remainder. To remove the blank after the work of the tool has been finished, it is merely necessary to rotate the blank in the normal direction of the drive, while the chuck is held stationary. The dogs are thereby withdrawn from their out position and the blank released. In order to enable the chuck to take heavy working strains, the dogs in the present construction are shown in the form of webs with longitudinal digging edges 21, but obviously the shape of the dogs may be variously modified to meet the requirements of any particular type of work. Again, it is not necessary to form the chuck head as an independent piece separate from the body, but it is a feature of manufacturing economy and convenience that it should be done, since the chuck head is preferably of steel, whereas there is no necessity that the entire chuck body should be so formed. Again, by reason of the construction of the head 17 independent of the body of the chuck, it is possible to change the chuck head for use with blanks of different internal diameter without the necessity for disconnecting the entire chuck from the lathe.

Various modifications of construction will readily suggest themselves to those skilled in the art without departing from what I claim as my invention.

I claim as my invention:—

1. A lathe chuck having a head adapted to enter a hollow blank, dogs mounted on said head and spring means automatically pressing said dogs outward into gripping position on the lag of blank with relation to the chuck during the working drive.

2. A lathe chuck having a head adapted to enter a hollow blank, dogs mounted thereon and moving outward to grip the blank on the lag of the latter with relation to the chuck during the working drive, and means insuring the simultaneous movement of all of said dogs.

3. A lathe chuck having a head adapted to enter a hollow blank, gripping dogs mounted thereon and a member swiveling with relation to said head and engaging said dogs to insure their simultaneous movement.

4. A lathe chuck having a head adapted to enter a hollow blank, gripping dogs pivoted thereon eccentric to the axis of the chuck, and means constantly tending to press the same into engagement with the blank.

5. A lathe chuck having a head adapted to enter a hollow blank, gripping dogs pivoted thereon eccentric to the axis of the chuck, and yielding means constantly tending to press the same into engagement with the blank.

6. A lathe chuck having a head adapted to enter a hollow blank, gripping dogs pivoted thereon on axes eccentric to but parallel with the axis of the chuck, and means constantly tending to press the dogs outward into engagement with the blank.

7. A lathe chuck having a head adapted to enter a hollow blank, bores eccentric to but parallel with the axis of said chuck and segmental cuts opening to said bores, gripping dogs pivoted in said bores and extending outward through said segmental cuts, substantially as described.

8. A lathe chuck having a head adapted to enter a hollow blank, bores eccentric to but parallel with the axis of said chuck and segmental cuts opening to said bores, gripping dogs pivoted in said bores and extending outward through said segmental cuts, together with spring means operatively connected to said dogs and tending constantly to force the latter outward into gripping position.

9. A lathe chuck having a head adapted to enter a hollow blank, bores eccentric to but parallel with the axis of said chuck and segmental cuts opening to said bores, gripping dogs pivoted in said bores and extending outward through said segmental cuts, together with a member common to said dogs and engaged thereby serving to insure their simultaneous expansion and withdrawal.

10. A lathe chuck having a head adapted to enter a hollow blank, bores eccentric to but parallel with the axis of said chuck and segmental cuts opening to said bores, gripping dogs pivoted in said bores and extending outward through said segmental cuts, together with spring means operatively connected to said dogs, and tending constantly to force the latter outward into gripping position and a member common to said dogs and engaged thereby serving to insure their simultaneous expansion and withdrawal.

11. A lathe chuck having a head adapted to enter a hollow blank, bores eccentric to but parallel with the axis of said chuck and segmental cuts opening to said bores, gripping dogs pivoted in said bores and extending outward through said segmental cuts, together with a member common to said dogs and engaged thereby serving to insure their simultaneous expansion and withdrawal, and spring means operating through said member to constantly force the dogs outward into expanded position.

12. A lathe chuck having a head adapted to enter a hollow blank, gripping dogs mounted therein and means tending constantly to maintain said dogs in their expanded position, said dogs yielding inwardly on the rotation of the blank in the direction of the drive with relation to the chuck.

13. A lathe chuck having a head adapted to enter a hollow blank, gripping dogs mounted therein and means tending constantly to maintain said dogs in their expanded position, said dogs yielding inwardly on the rotation of the blank in the direction of the drive with relation to the chuck, and means to insure the simultaneous movement of all the dogs.

In testimony whereof I have signed my name to this specification, in the presence of two subscribing witnesses.

ABEL E. CHERNACK.

Witnesses:
WM. C. GREENE,
F. J. GRAMELSBACH.

Copies of this patent may be obtained for five cents each, by addressing the "Commissioner of Patents, Washington, D. C."